United States Patent [19]

Coronel

[11] Patent Number: 5,352,162
[45] Date of Patent: Oct. 4, 1994

[54] DUAL CONCENTRIC POSITIVELY INFINITELY VARIABLE ROTARY MOTION TRANSMISSION

[76] Inventor: Paul K. Coronel, c/o Noreen Chun, 3840 Claudine St., Honolulu, Hi. 96816

[21] Appl. No.: 977,112

[22] Filed: Nov. 16, 1992

[51] Int. Cl.⁵ .......................................... F16H 19/00
[52] U.S. Cl. ................................... 475/169; 475/170
[58] Field of Search ............... 475/169, 269, 334, 170; 74/68, 69, 392, 393, 396

[56] References Cited

U.S. PATENT DOCUMENTS

| | | | |
|---|---|---|---|
| 1,753,784 | 4/1930 | Herzog | 475/170 |
| 2,018,533 | 10/1935 | Ramin | 74/69 |
| 2,097,283 | 10/1937 | Kohn | 475/170 |
| 3,116,650 | 1/1964 | Farley | 475/170 |
| 3,442,158 | 5/1969 | Marcus | 475/170 |
| 3,589,212 | 6/1971 | Marcus | 475/170 |
| 4,497,221 | 2/1985 | Koser | 475/169 X |
| 5,113,712 | 5/1992 | Economou | 74/69 |

FOREIGN PATENT DOCUMENTS 275298  1/1990  Fed. Rep. of Germany ...... 475/169

*Primary Examiner*—Dirk Wright
*Assistant Examiner*—Khoi Q. Ta

[57] ABSTRACT

The principle of dual concentricity is described and utilized within a Dual Concentric Positively Infinitely Variable transmission; a true all-geared torque-converting positively infinitely variable transmission which utilizes a user actuated independent input control to vary the transmission output. The input control varys the orbital relationship and effective gear ratio between a driving ring gear and a driven pinion gear causing both gears to variably orbit the mechanism central axis to produce an output receiving gear and connected output shaft torque converting speed range operating between a geared neutral stopped position and its maximum output speed.

12 Claims, 3 Drawing Sheets

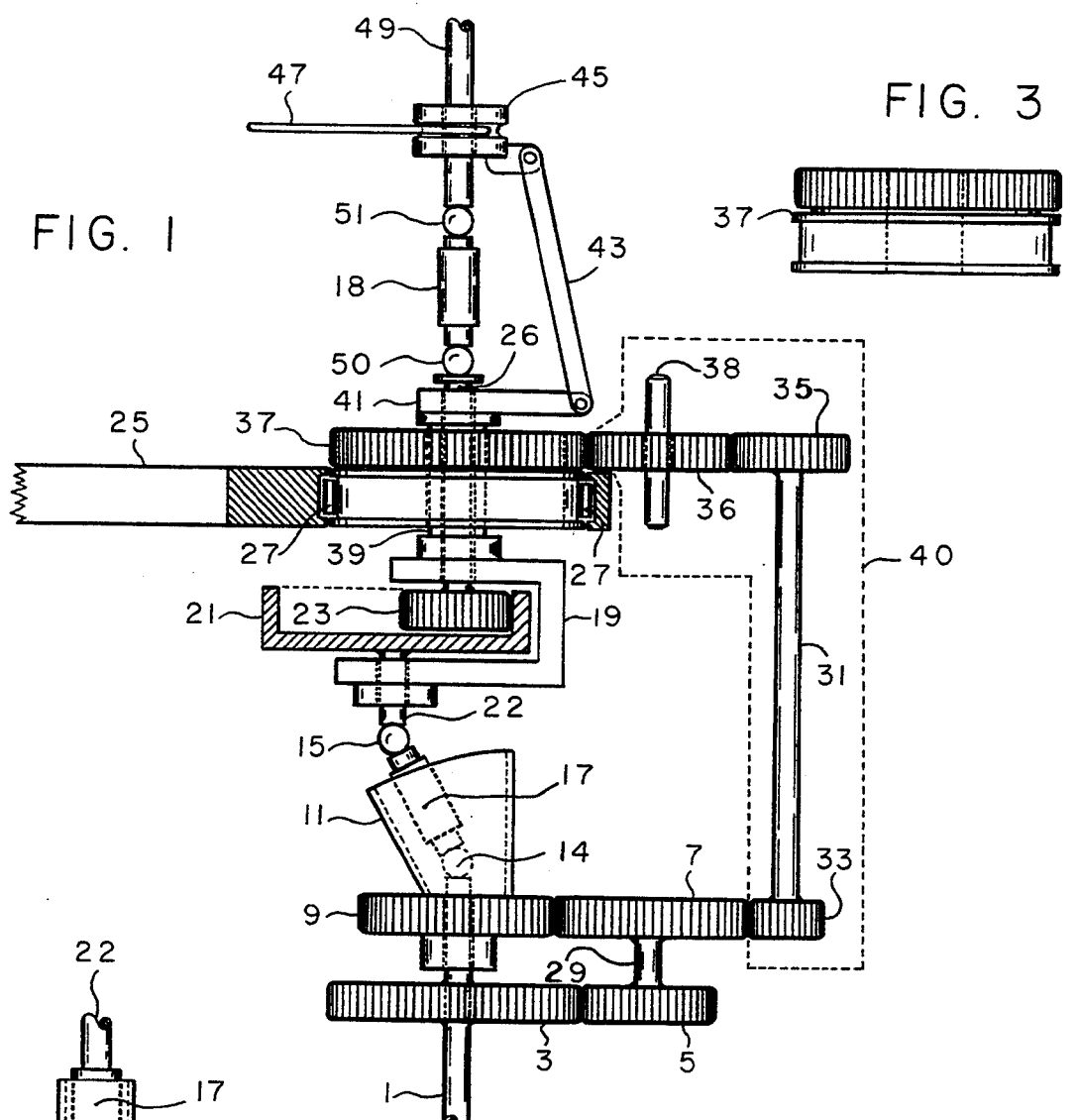
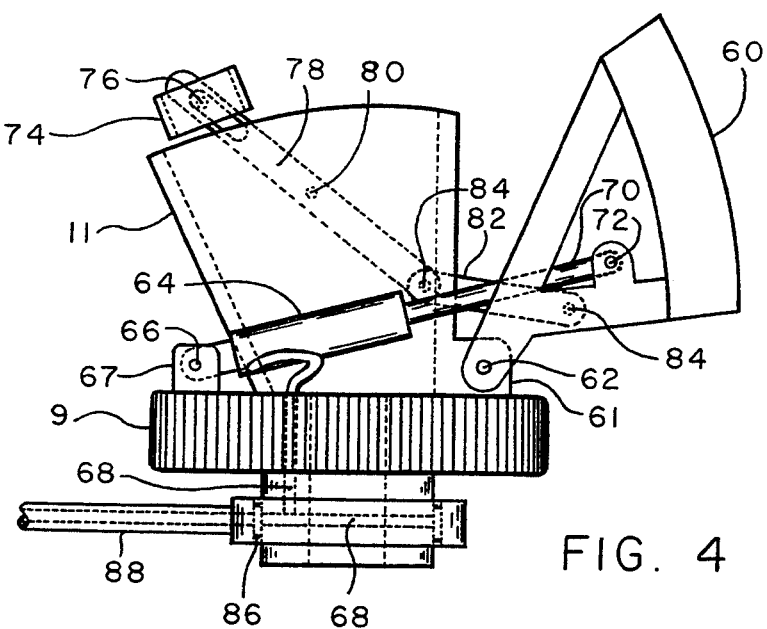

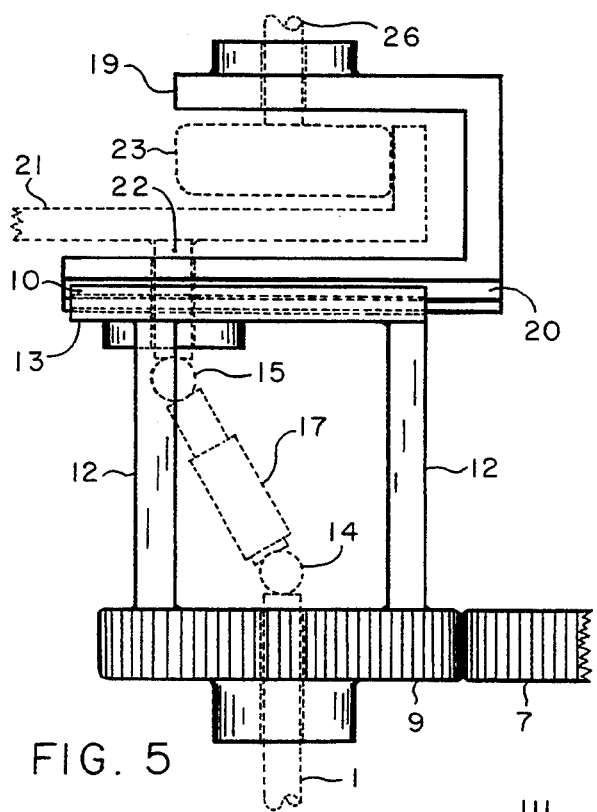
FIG. 5
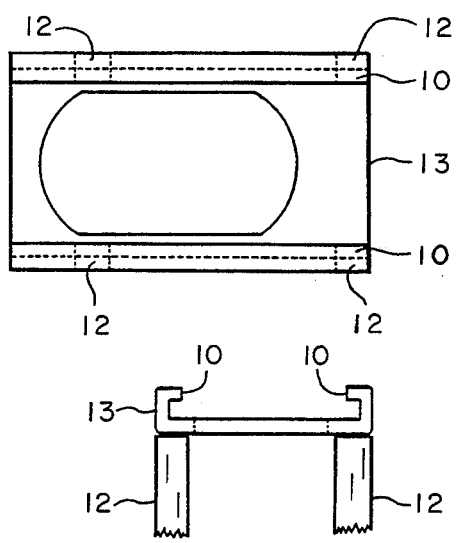
FIG. 6
FIG. 7
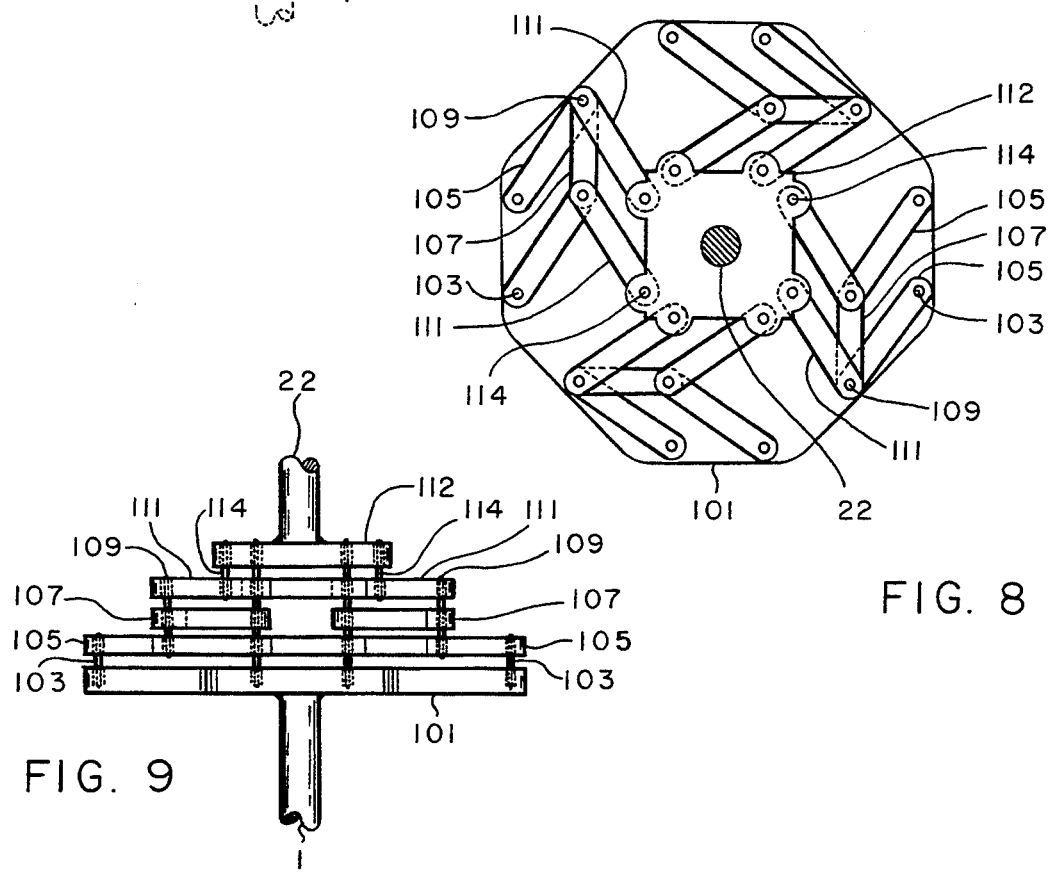
FIG. 8
FIG. 9

DUAL CONCENTRIC POSITIVELY INFINITELY VARIABLE ROTARY MOTION TRANSMISSION

FIELD OF THE INVENTION

This disclosure relates to the transmission of angular velocity, specifically to its mechanical transmission through the use of all-geared torque converting, continuously engaged positively infinitely variable (PIV) transmissions. This disclosure further relates to PIV transmissions utilizing dual concentric gearing rotating and orbiting about the mechanism central axis.

STATEMENT OF PRIOR ART

The modern need for rotary motion transmission devices originated with the introduction of internal combustion engines producing narrow ranges of high power output. Two forms of transmissions appeared: (1) infinitely variable traction devices, and (2) geared multiple-ratio shifting mechanisms. Both forms experienced serious limitations.

Multiple-ratio gear boxes require clutching mechanism to interrupt drive continuity during ratio shifting. Therefore, these mechanisms must incorporate friction clutches or fluid torque converters which have limited life spans, waste generated energy, and are mechanically complex.

Infinitely variable devices are preferable since they are capable of being varied to the exact desired ratio. Therefore, efforts have continued to perfect these. Initial efforts included a wide variety of friction traction devices utilizing wheels sliding across disks or cones. Limitations of these devices included rapid wear and limited traction producing short mechanism life-spans.

Attempts have been made to overcome these limitations through replacing the sources of friction with mechanisms to duplicate their functions:

U.S. Pat. No. 4,700,589 (Coronel, 1986) introduced all-geared exponential angular velocity multiplication. Changes in motor speeds actuated exponential changed in output speeds. A limitation of this design is the inability of the user to independently separate and vary the motor speed from the transmission output speed.

U.S. Pat. No. 4,983,151 (Pires, 1991) was issued for the infinitely variable transmission. This invention repositions a variable positionable index plate to introduce variable motion pulses to modify angular velocity transiting from a geared-neutral position. A limitation of the device is its use of one-way rachets in overrunning gears with the inherent inability to completely eliminate the resulting rotational and torque pulses. This places torque limitations upon its operational capability where too much torque will result in mechanical damage.

These efforts fail as they attempt to mimic with mechanical complexity a continuously variable ratio geared device rather induce a gear set to infinitely vary its output.

INTRODUCTION

The purpose of this disclosure is to described the Dual Concentric Positively Infinitely Variable (DCPIV) transmission operational principle and its application in the mechanical rotary motion transmission.

The DCPIV is a true all-geared torque converting positively infinitely variable transmission which utilizes a user actuated independent input control to vary the transmission output. The input control changes the effective ratio between a driving ring gear and a driven pinion gear by physically repositioning them relative to the mechanism's central axis. This produces an output receiving gear and attached output shaft torque converting speed range operating between a geared neutral stopped position and its maximum driven speed. The resulting output is a reversed directional output shaft rotation with a ratio infinitely ranging from 1:0 at the geared neutral configuration to 1:2 and greater at maximum speed, depending on the actual size relationship between the dual concentric gears. No secondary rotational motion injection or extraction is required to actuate the mechanism and no friction clutch or torque converter mechanisms are necessary to couple the transmission to the drive train.

This disclosure further describes the construction, operation and advantages of various configurations of the invention. The preferred embodiment is shown in FIG. 10 in its high speed output configuration.

THE PRINCIPLE OF DUEL CONCENTRICITY

The definition of the terms "duel concentric" or "dual concentricty" refers to the mechanics of two individual gears, engaged with one another which: (1) change their positions relative to the mechanism central axis, and (2) change their concentric orbital relationships relative to one another. A dual concentric positively infinitely variable transmission utilizes the principle of dual concentricity to change the concentric orbital relationships of two engaged gears to convert input rotational motion into two separate components: (1) rotational motion, and (2) orbital motion. During operation at the geared neutral phase, the orbital component effectively cancels the rotational component. During the torque converting transition, and varying levels of mechanical output, the orbital component is gradually decreased until only the rotational component remains, producing full speed transmission output.

The operational core of the disclosed mechanism is the dual concentric gearing consisting of: (1) a driver ring gear which is permanently connected via a universally jointed telescoping drive shaft to the driving motor, and (2) a separate output receiving gear connected to a universally jointed output shaft, with the gear permanently connected in a drive relationship to the internal gearing of the driver ring gear. The output receiving gear shaft freely rotates within and is supporting by a bearing which is concurrently orbitally driven in the same direction as the driver ring gear rotation and orbiting. This orbiting of the bearing (supporting the output shaft and attached output receiving gear) is driven: (1) by the orbital motion of the variable orbital aligner as revolved by the orbital motion of the driver ring gear, and/or (2) through an optional gear train connected to and driven by the input shaft to rotate the bearing around the mechanism's central axis at the identical orbital (not rotational) speed of the driver ring gear. The driver ring gear is further driven in a manner in which its orbital motion continuously induces it into non-circular consecutive elliptical cycles of orbiting around the output receiving gear. These cycles occur in varying spheres during all operational phases except full output speed. At full output speed, the central axis of the driver ring gear is aligned with the mechanism central axis and rotates without elliptical orbiting. The balancing system drive gear drives the output receiving gear at the orbital speed of the driver ring gear. This is faster than the rotational speed of the driver ring gear. Therefore the output receiving gear is driven into, rather than against the rotating driver ring gear to produce its reversed output drive.

Thus, when the mechanism is operating in its geared neutral configuration, the central axis of the output receiving gear is aligned with the mechanism the central axis and the driver ring gear is sustaining maximum elliptical orbiting around it. Upon actuation of the mechanism to initiate output, the output receiving gear commences its initial orbiting consisting of small circular orbits about the mechanism central axis. The exterior circumference of this output receiving gear orbital path now limits the driver ring gear to elliptically orbit this orbital path, reducing the size of its off-setting elliptical orbital path while maintaining it rotational speed.

The orbital speed of the output receiving gear as driven by the balancing system drive gear now begins to drive the output receiving gear into the elliptically orbiting driver ring gear, inducing its rotation in a reversed direction, producing the initial output. However, the actual path experienced by the engaged output receiving gear is circular, not elliptical. This is because the point of engagement between the driver ring gear and the output receiving gear is always at the latter's orbital path.

The size of the elliptical cycles of the driver ring gear continue to be reduced as the user actuates speed increases resulting in enlargement of the output receiving gear's orbital path. Upon achieving the mechanism's maximum output speed configuration, the output receiving gear orbital path equals the interior circumference of the rotating driver ring gear. The output receiving gear is now orbiting at its maximum speed, which is faster than the rotational rate of the driver ring gear, thus driving the output receiving gear into the rotating driver ring gear to produce maximum reversed directional output.

At the geared neutral operating configuration, the concurrent orbiting/rotating of the driver ring gear creates an effective ring gear ratio equal to that of the output receiving gear at rest, precluding its rotation. This ratio is labeled "effective" as no real mechanism output is produced and no engine torque is exhausted. However, upon initiation of the orbiting of the output receiving gear, this effective ratio changes. The internal circumferential gearing of the driver ring gear now available for output receiving gear travel exceeds the size of the output receiving gear, inducing its rotation (with the transmission of engine torque) and the connected output shaft as the output receiving gear is orbited into the expanded ring gear path.

OBJECTIVES OF THE INVENTION

The objectives of the mechanisms include the mechanical inception of the following advantages:

1. An all-geared transmission permanently coupled to the driving motor without the requirement for friction inducing clutches or torque converting devices.

2. A transmission capable of maintaining a geared neutral output stopped position as well as initializing torque converting output drive actuation with any motor input speed.

3. A transmission which provides user-actuated infinitely varying output from its geared neutral stopped position without any drive line disengagement and individual gear ratio shifting. The infinitely varying capability further inherently provides the effects of conventional low geared and overdrive operations.

4. A transmission which provides infinitely varying motor compression braking from any speed to the vehicular or machine stopped position.

5. A transmission which increases the efficiency of the transfer of power from the motor to vehicle wheels to increase fuel conservation and decrease pollution.

6. A positively infinitely variable transmission which is actuated without injections or extractions of rotary motion.

7. A dual concentric positively infinitely variable transmission with a parallel rotary driver to eliminate the necessity for (1) a telescoping drive shaft and (2) universal shaft joints to reduce the overall length of the mechanism.

8. A dual concentric positively infinitely variable transmission utilizing a driving drum attached to the orbital driver gear to rotate a balancing system drive disk to utilize parallel rotary drivers attached to both the input and output shaft to eliminate all telescoping shafts and reduce the length of the transmission.

BRIEF DESCRIPTION OF THE DRAWINGS

FIG. 1 shows a side view of the duel concentric positively infinitely variable transmission including the user-operated actuator. Only the primary mechanism framework support is included.

FIG. 2 shows a front view of the orbital driver gear with attached variable orbital driver. The purpose of this view when compared to the related view in FIG. 1 is to show the limited directional inclining pivoting of the lower telescoping shaft.

FIG. 3 shows a front view of the balancing system drive gear including a narrow internal cross section of the output receiving shaft bearing slot. The purpose of this view when compared to the related view in FIG. 1 is to show how construction of the slot limits the output receiving shaft bearing to movement partially across only one axis of the balancing system drive gear.

FIG. 4 is a side view of a counter balanced actuator utilizing a hydraulic cylinder to actuate concurrent repositioning of the dual concentric mechanism and counter balancing counterweight.

FIG. 5 shows a side view of the integrated orbital driver utilizing a variable orbital aligner repositionable upon a sliding driver base and rotated directly by the orbital driver gear.

FIG. 6 shows a top view of the sliding driver base.

FIG. 7 shows a side view of the sliding driver base with attached mounting supports.

FIG. 8 shows a top view of a parallel rotary driver and attached variably positionable universal shaft driver.

FIG. 9 shows a side view of a parallel rotary driver and attached variably positionable universal shaft driver.

DETAILED DESCRIPTION OF THE CONSTRUCTION OF THE TRANSMISSION

Figure 10:
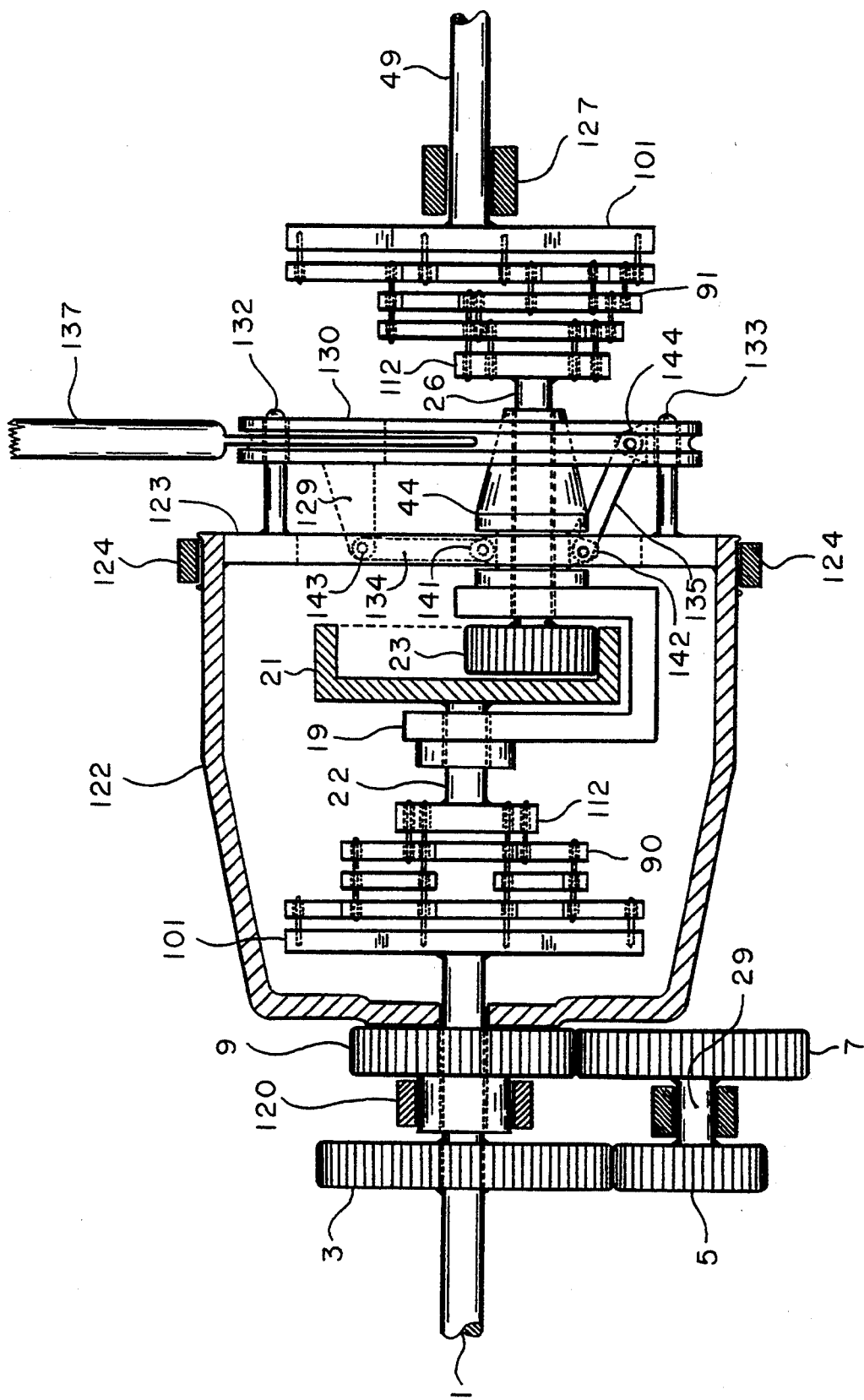
FIG. 10 shows a side view of the Dual Concentric Positively infinitely Variable transmission utilizing two parallel rotary drivers and a orbital driver gear rotating a driving drum and balancing system driver disk.

During construction of the dual concentric positively infinitely variable transmission of FIG. 1, the input shaft 1 is positioned at the mechanism central axis and journaled through supporting framework with its first end permanently connected to the mechanism driving motor. The second end of input shaft 1 is journaled through the orbital driver gear 9 and attached to universal joint 14.

Telescoping shaft 17 comprises a round exterior circumference capable of concurrently (1) rotating, and (2) changing its angular relationship to the mechanism central axis within the angled slot of the variable orbital driver 11 as depicted in FIGS. 1 and 2. The lower end of shaft 17 is attached to lower universal joint 14. An extendable and retractable telescoping upper shaft is attached to universal joint 15.

Ring gear shaft 22 is journaled for free rotation through the lower arm of the variable orbital aligner 19. Shaft 22 is attached on its first end to universal joint 15 and attached to the driver ring gear 21 on its second end.

The output receiving gear 23 is connected in a driven relation with the internal circumferential gearing of the driver ring gear 21. The output receiving gear shaft 26 is journaled for free rotation through the output receiving shaft bearing 39. It is further attached to the output receiving gear 23 on its first end and attached to the universal joint 50 on its second end. The first end of a second telescoping shaft 18 is attached to a universal joint 50 as depicted in FIG. 1 and its second end is attached to upper universal joint 51. Output shaft 49 is positioned at the mechanism central axis, journaled through supporting frame work and has its first end attached to upper universal joint 51.

The first end of the wide variable mechanism support 25 is rigidly attached to supporting framework. Its second end is vertically bored through its thickness with a bearing race for sustaining the free rotation of the bearing support portion of the balancing system drive gear 37 upon individual roller bearings 27.

Balancing system drive gear 37 of FIGS. 1 and 3 is gear wheel with a raised flange bearing race edge depending from its lower side for sustaining the free rotation of supporting bearings 27. Drive gear 37 further has a centrally bored slot for the rotational/orbital driving of output receiving shaft bearing 39.

The output receiving shaft bearing 39 comprises a centrally bored squared shaft attached on its first end to the variable orbital aligner 19 and on its second end to the shaft bearing actuator 41. The squared bearing 39 is positioned through the balancing system drive gear 37 to laterally slide while rotating/orbiting within the slot bored through the balancing system drive gear 37. The rotating/orbiting shaft bearing 39 is positioned at the central axis during geared neutral operation, but is moved to orbit the central axis during mechanism actuation for producing of output shaft rotation. The variable orbital aligner 19 and bearing actuator 41 permit horizontal bearing repositioning along the balancing system drive gear 37 sliding slot while maintaining vertical alignment of the dual concentric repositionable components.

Boundary 40 contains optional gearing to rotate balancing system drive gear 37 concurrently with the orbital driving of output receiving shaft bearing 39 and variable orbital aligner 19.

Centrally bored input transfer gear 3 is attached to input shaft 1 and connected in a driving relationship with input receiving gear 5. Transfer shaft 29 is journaled through supporting framework and attached on its first end to input receiving gear 5 and on its second end to transfer gear 7. Transfer gear 7 is connected in a driving relation with both the orbital driver gear 9 and the optional balancing system receiving gear 33. Transfer shaft 31 is journaled through supporting framework with its first and attached to balancing system receiving gear 33. Balancing system transfer gear 35 is attached to the second end of transfer shaft 31. Idler shaft 38 is attached to supporting framework. Idler gear 36 freely rotates around shaft 38 and is connected in a drive relation with balancing system transfer gear 35 and a driving relation with balancing system drive gear 37.

Centrally bored sliding actuator 45 embodies a slot upon the center of its outer circumference and freely rotates around the output shaft 49. Pivoting actuating linkage 43 is attached with hinge pins on one end to the sliding actuator 45 and on another end to the extended arm of shaft bearing actuator 41.

During construction of the alternate counterbalanced actuator of FIG. 4, the base of hydraulic cylinder 64 is attached to flange 67 mounted to the top front side of orbital driver gear 9 with pivot pin 66. The "U" shaped pivoting counterweight and support 60 is attached to two separated aligned mounting flanges 61 with pivot pin 62. Hydraulic arm 70 is attached to counterweight 60 with pivot pin 72. Mechanism actuator arm 78 is pivotally mounted to the far side of variable orbital driver 11 with pivot pin 80. Centrally bored actuating bearing 74 has the top shaft portion of lower telescoping shaft 17 journaled through it (not shown) and is attached on its far side of the top slot of actuating arm 78 with pivot pin 76. Connecting linkage 82 is attached to the bottom of actuator arm 78 on one end, and counterweight 60 on another end with pivot pins 84. Centrally bored hydraulic collar 86 is positioned around the lower bearing of orbital driver gear 9 and attached to supporting framework with hydraulic pressure pipe 88. Dual hydraulic lines are separated and contained between the collar 86 and rotating orbital driver gear 9 with pressure seals. Pressurized hydraulic fluid flows into cylinder 64 through passages 68 bored within orbital driver gear 9 and flexible hoses attached between the upper gear 9 surface and cylinder 64.

During construction of the alternate integrated orbital driver of FIG. 5-7, the sliding driver base 13 contains two parallel inward angled guide lips 10 attached to the base 13 sides. Base 13 is further bored with an elongated central slot for travel of the variable orbital aligner's lower bearing bushing. Base 13 is attached to the orbital driver gear 9 with four supports 12. Two parallel guide slots 20 are milled within opposite sides of variable orbital aligner 19 to permit it to laterally slide within base 13 upon guide lips 10 during repositioning of the dual concentric gearing relative to the mechanism central axis.

During construction of the alternate parallel rotary driver depicted in FIGS. 8 and 9, base disk 101 is centrally attached to input shaft 1 and positioned at the mechanism central axis with at least one set of parallel arms connecting universal shaft driver 112 to the base disk 101. Base disk 101 comprises a circular platform rotatable about its central axis as driven by shaft 1. Base Disk 101 further includes pivot pin mounting positions for the outer parallel arm pivot pins.

Universal shaft driver 112 comprises a universally positionable round or square mounting platform for attachment of the first end of ring gear shaft 22. Universal shaft driver 112 further includes pivot pin mounting positions for the inner parallel arm pivot pins.

Each set of parallel arms include two outer arms 105 with their first end pivotably attached to one edge of base disk 101 with base pins 103. The second ends of outer arms 105 are pivotably attached to opposite ends of pivot link 107 with pivot pins 109. The first ends of two inner parallel arms 111 are also pivotably attached to opposite ends of pivot link 107 with pivot pins 109. The second ends of inner parallel arms are pivotably attached to one edge of universal shaft driver 112 with pivot pins 114.

An advantage of this use of parallel arms is to permit an input shaft positioned at the mechanism central axis to drive the universal shaft driver 112 while permitting shaft driver 112 to concurrent orbit the mechanism central axis with a varying sized orbital path. This eliminates the necessity for (1) a telescoping drive shaft and (2) universal shaft joints, resulting in a reduction of the distance between the input shaft 1 and the ring gear shaft 22 and a reduction of the overall length of the mechanism.

During construction of the preferred embodiment of the transmission shown in FIG. 10, input shaft 1 and output shaft 49 are aligned with one another and positioned at the mechanism central axis. Orbital driver gear 9 is attached to and rotates driving drum 122 and the attached balancing system drive disk 123 which concurrently rotates/orbits the actuating bearing 44 at or about the mechanism central axis. Two parallel rotary drivers 90 & 91 are installed to replace all telescoping shafts and universal joints. A laterally sliding actuator 130 is connected to and rotates with drive disk 123 and driving drum 122 to control and modify transmission output with lateral movements of control fork 137.

The rotating bearing support attached to and extending from the first side orbital driver gear 9 is journaled through foot bearing 120 mounted to supporting framework. The centrally bored first end of drum 122 is attached to and shares a contiguous central bore with the second side of orbital driver gear 9 to rotate around the mechanism central axis. Balancing system drive disk 123 is attached to the second end of drum 122. Drum bearings 124 are mounted to supporting framework to support the second end of rotating driving drum 122 and drive disk 123 unit.

The base disk 101 of first parallel rotary driver 90 is attached to the second end of input shaft 1. The variable positionable universal shaft driver 112 of the first parallel rotary driver 90 is attached to the ring gear shaft 22. The first parallel rotary driver 90 and the dual concentric gearing operate within the interior of the rotating driving drum 122.

The balancing system drive disk 123 replaces the balancing system drive gear 37 of FIGS. 1 & 3. Drive disk 123 contains: (1) a slot bored parallel to the mechanism central axis and across the disk central axis for the lateral sliding of the linked actuating bearing 44, (2) the first ends of sliding guide pins 132 and 133 attached thereto and extending laterally therefrom, and (3) a channel for pivot mount 144 and attached linkage 135.

Actuating bearing 44 comprises a centrally bored square sliding bearing with: (1) two hub bearing surfaces for lateral sliding within the drive disk 123 slot, (2) two centrally bored circular lips at each hub bearing end, and (3) two pivot mounts 141 and 142 attached to the remaining two opposed hub bearing sides. The upper arm of variable orbital aligner 19 is attached to the first guide lip and shares a contiguous bore with bearing 44 for the rotation of shaft 26. The bearing 44 guide lips maintains correct mechanism alignment of bearing 44, shaft 26, aligner 19, and the dual concentric gearing during all operational configurations of these components.

Laterally sliding actuator 130 comprises a centrally bored circular disk with a slot bored within its exterior circumferential edge for the sliding of control fork 137. Holes for at least two sliding guide pins 132 and 133 are laterally bored through the actuator near opposing edges. Pivot mount support 129 is attached to the first side of actuator 130 and sustains pivot mount 143 attached to its first end. Pivot mount 144 is attached to actuator 130 within a channel within the central bore.

Actuating bearing 44 is connected to sliding actuator 130 with one of two actuator linkages 134 or 135. Linkage 134 is pivotally attached to pivot mount 143 on its first end, and pivot mount 141 on its second end. Alternate linkage 135 is pivotably attached to pivot mount 142 on its first end and pivot mount 144 on its second end.

The variable positionable universal shaft driver 112 of the second parallel rotary driver 91 is attached to the end of output receiving gear shaft 26. The base disk 101 of the second parallel rotary driver 91 is attached to the mechanism output shaft 49 to convert concurrent shaft 26 orbital and rotational motion to only constant rotational output. Output shaft 49 is journaled through bearing 127 attached to supporting framework.

An alternative means (not shown) to drive the balancing system drive disk 123 of FIG. 10 and eliminate driving drum 122 incorporates gear teeth added to the exterior circumference of disk 123 to create a drive gear similar to balancing system drive gear 37 of FIG. 1, and extend the length of transfer shaft 29 to permit transfer gear 7 to engage exterior gearing and drive disk 123. This alternative requires the modifications of the sizes of the gears and/or their angles of engagement.

DETAILED DESCRIPTION OF THE MECHANICAL OPERATION OF THE TRANSMISSION

During operation of the mechanism, motor input concurrently rotates (1) input shaft 1 with attached input transfer gear 3, and (2) the driver ring gear 21 through the ring gear shaft 22, telescoping shaft 17 and two universal joints 14 & 15. Simultaneously, orbital driver gear 9 and attached variable orbital driver 11 are rotated faster than input transfer gear 3 through transfer gear 7 and input receiving gear 5. When the output receiving gear 23 is positioned at the mechanism's center axis which is also the mechanism's geared neutral configuration, the variable orbital driver 11 swings the lower telescoping shaft 17 around the central axis to orbit the driver ring gear 21 around the engaged output receiving gear 23 faster than the driver ring gear 21 is rotatively driven by the input shaft 1. This produces a small inner circumferential orbital path with a small effective gear ratio for the driver ring gear 21. This small effective gear ratio equals the gear ratio of the output receiving gear 23, resulting in zero rotation and the stopped position of the output receiving gear 23 and connected output shaft 49.

Synchronously to the operation of the lower mechanics of the mechanism of FIG. 1 is the optional balancing system drive gear assembly generally indicated within the optional gearing boundary 40 of FIG. 1. During operation of the optional assembly, balancing drive gear 37 is rotated in unison with the orbital speed of the driver ring gear 21 and variable orbital driver 11 as driven by gearing 36, 35, 33, 7 and 9. When the output receiving gear 23 is positioned at the mechanism central axis during the geared neutral operational configuration, it experiences no orbiting of the central axis and thus no induced rotation.

An alternative means of rotating the balancing system drive gear 37 without the connecting gear train is to use the rotational/orbital motion of the output receiving shaft bearing 39 as driven by the variable orbital aligner 19. Orbital motion of the driver ring gear will rotate gear 37 providing maximum output speed of the mechanism is restricted to precluding the central axis of the driver ring gear from aligning with the mechanism central axis. This is necessary to sustain drive continuity of the variable orbital driver 11 driving of the angled telescoping shaft 17.

During actuation of the mechanism, control fork 47 freely slides within the central of sliding and rotating actuator 45. The actuating linkage 43 converts the vertical motion to horizontal motion to reposition the rotating shaft bearing actuator 41 relative to the mechanism central axis. This concurrently repositions the attached output receiving shaft bearing 39, output receiving shaft 26 and attached output receiving gear 23 away from the mechanism central axis. With the rotating balancing system drive gear 37 and/or the rotating/orbiting output receiving shaft bearing 39 inducing driving orbiting of these components, the output receiving gear accomplishes two simultaneous actions:

First, the outer circumference of its orbital path becomes larger than its individual circumference when positioned at the mechanism central axis. Since the orbital speed of the output receiving gear and the orbital speed of the driver ring gear are identical, this larger outer circumferential path consistently forces the driver ring gear to orbit and rotate around it. Due to the identical orbital speeds, the point of engagement of the driver ring gear with the orbiting output receiving gear is always on its side furthest from the mechanism central axis (which is also its orbital path). Thus, the new path becomes the effective gear circumference of the driver ring gear 21 (which now exceeds the circumference of the output receiving gear 23 by itself). The size of this path changes with every variation in mechanism output speed. The path will also be smaller than the interior circumference of the driver ring gear, except when the transmission is producing full output speed. At full speed, the path and the interior ring gear circumference will be identical.

Second, since the orbital speed of the output receiving gear 23 is faster than the rotational speed of the driver ring gear (with any sized path), the output receiving gear is orbited into the now larger effective rotating gear path of the driver ring gear 21, inducing it and the connected output shaft to rotate in a reversed direction, producing mechanism output.

Further movements of the control fork 47 produce larger outer circumferential driver ring gear 23 orbital paths. These larger paths provide more effective gearing for the output receiving gear to orbit into, producing further accelerations of the output receiving gear 23 reversed direction rotation speed. This continues until the outer circumferential orbital path of the driver ring gear 23 equals the interior circumferential gearing of the driver ring gear 21. At this point, the driver ring gear ceases orbiting while continuing to rotate. And since the output receiving gear 23 continues orbiting faster than the driver ring gear is rotating, producing the maximum output receiving gear 23 reversed direction speed.

During operation of the counterbalanced actuator of FIG. 4, pressurized hydraulic fluid enters and exits hydraulic cylinder 64 through pressure pipes 88, sealed collar 86, rotating orbital driver gear 9 and the flexible hoses. Pressure extends and retracts arm 70 to concurrently (1) pivot and return the counterweight 60 in a first direction, and (2) pivot and return the actuating bearing 74 in an opposite direction. This repositions the dual concentric geared assembly relative to the mechanism central axis and concurrently repositions the counterweight 60 to counterbalance the geared assembly. All degrees of actuation are concurrently and automatically proportionally counterbalanced.

During operation of the integrated orbital driver of FIGS. 5–7, rotation of the orbital driver gear 9 rotates base 13 through supports 12. Variable orbital aligner 19 is rotated by, and laterally slides upon base 13 during repositioning of the dual concentric gearing relative to the mechanism central axis.

I claim the inventions and all variations or modifications which are within the scope of the following claims:

1. A positively infinitely variable, rotational motion transmission connecting a rotating input shaft and rotatable output shaft aligned with one another and positioned at a mechanism central axis, comprising:
   A. dual concentric gearing means including a circular driver ring gear rotatable about its central axis, connected to an input shaft, and engaged to a circular output receiving gear rotatable about its central axis, wherein the circular driver ring gear is orbiting the circular output receiving gear (1) with its axis aligned with (2) the mechanism central axis without rotating the circular output receiving gear to produce a geared neutral configuration, wherein the driver ring gear axis is aligned with said mechanism central axis to produce a maximum output speed and with the driver ring gear axis positioned arbitrarily between said mechanism central axis and said geared neutral configuration to produce an infinitely variable output speed range;
   B. said output receiving gear connected to the output shaft, engaged to the driving ring gear, capable of orbiting the mechanism central axis, wherein said output receiving gear axis is aligned with the mechanism central axis during said geared neutral configuration with the output receiving gear axis orbiting the mechanism central axis on an axis between said mechanism central axis and said maximum output speed position to produce said infinitely variable output speed range;
   C. said driver ring gear rotating upon a plane when positioned at the mechanism central axis, and concurrently rotating and variably orbiting the mechanism central axis upon said plane by means of an input shaft positioned at the mechanism central axis with a first universal joint attached on one end, a rotating telescoping shaft attached on one end to the first universal joint and attached on its other and to a second universal joint and the driver ring gear with a ring gear shaft attached to the second universal joint, wherein the input shaft drives the driver ring gear to rotate and variably orbit the mechanism central axis upon said plane;

D. a variable orbital driver aligned with and rotating at the mechanism central axis, including a rotating guide with an internal opening enveloping said driver ring gear first universal joint and attached telescoping shaft permitting the angular pivoting of the telescoping shaft between vertical alignment with the mechanism central axis to a single sided angle, wherein the variable orbital driver orbits said rotating telescoping shaft and driver ring gear around the mechanism central axis;

E. said output receiving gear capable of concurrently rotating and variably orbiting the mechanism central axis upon said plane, by means of: an output shaft positioned at the mechanism central axis with a first universal joint attached on one end, a rotating telescoping shaft attached on one end to the first universal joint and attached on its other end to a second universal joint, and an output receiving gear shaft attached on one end to the output receiving gear, and attached on its other end to the second universal joint, wherein the output receiving gear concurrently rotates and orbits the mechanism central axis upon said plane to concurrently drive said output shaft;

F. a gear train driving the variable orbital driver, including an input transfer gear attached to the input shaft, a central bored orbital driver gear freely rotating around the input shaft and attached to the variable orbital driver, and a transfer shaft journaled with an input receiving gear attached to its first axial end and driven by the input transfer gear, and a transfer gear attached to its second axial end and driving the orbital driver gear, wherein input shaft rotation drives the variable orbital driver in a concurrent direction at a faster speed established by a predetermined gear ratio;

G. a rotating mechanism sustaining apparatus supporting said dual concentric gearing, including a balancing system drive gear supportatively rotating upon bearings within a bored variable mechanism support, including: a circular bearing race for sustaining bearings and a slot bored through said balancing system drive gear and extending between its axis and an edge, a centrally bored output receiving shaft bearing being squared on its exterior flat bearing faces for repositioning within said slot with a travel limiting flange lip attached to one end and attached to a shaft bearing actuator on another end, wherein the output receiving gear shaft is journaled through the central bore of the output receiving shaft bearing, and the output receiving shaft bearing is journaled through the slot of the balancing system drive gear for non-rotative repositioning between its geared neutral position and maximum output positions during movement along the slot to rotate with the balancing system drive gear as a unit;

H. a variable orbital aligner sustaining geared engagement positioning between the driver ring gear and the output receiving gear, including a reinforced "U" shaped supporting brace oriented perpendicular to the central axis with a short end and a long and for respective legs of the U-shaped brace, with: the output receiving shaft journaled through said short and, and the ring gear shaft journaled through said long end, wherein said supporting brace extends around the driver ring gear and output receiving gear to align them and supportively sustain their engaged rotating and orbiting relationship;

I. an orbital direct drive arrangement wherein the balancing system drive gear is rotated by orbital travel of the output receiving shaft bearing as driven by variable orbital aligner orbital motion;

J. means to variably counterbalance said driver ring gear, said output receiving gear and repositionable assemblage during all phases of actuation;

K. control means for controllably varying the distance of said output receiving gear shaft center from said mechanism central axis.

2. The transmission as claimed in claim 1 wherein said orbital direct drive arrangement comprises an orbital coordinating system coinciding said driver ring gear orbital speed with said output receiving gear orbital speed, including:

A. a transfer shaft;

B. a balancing system receiving gear attached to the transfer shaft first end and connected in a driven relation with the transfer gear, C. an idler shaft journaled through an idler gear, the idler gear further connected in a driving relationship with the balancing system drive gear;

D. a balancing system transfer gear attached to the transfer shaft second end and connected in a driving relation with the idler gear, wherein the balancing system drive gear orbits the output receiving gear with an identical speed and direction as the driver ring gear during all transmission output operational configurations.

3. The transmission as claimed in claim 2 which said counterbalancing means includes a counterbalancing actuating system with a hydraulic cylinder attached to the rotating orbital driver gear to concurrently (1) extend a counterweight and (2) reposition the dual concentric gearing relative to the mechanism central axis to variably actuate the transmission and maintain the rotational balance of its operating components.

4. The transmission as claimed in claim 3 with an integrated orbital driver, including a variable orbital aligner sliding upon a base attached to the rotating orbital driver gear; wherein repositioning of the driver ring gear and output receiving gear slides the variable orbital aligner along the base, and rotation of the orbital driver gear rotates the variable orbital aligner as repositioned.

5. The transmission as claimed in claim 4 where said control means includes:

A. a shaft bearing actuator attached to and sharing a contiguous central bore with a output receiving shaft bearing, including an arm extending laterally therefrom parallel to said balancing system drive gear slot;

B. a central bored sliding actuator with a control fork slot, movable axially upon an output shaft;

C. an actuator linkage pivotally attached to said sliding actuator on one end and pivotally attached to said shaft bearing actuator arm on another end;

D. a control fork mounted on said sliding actuator control fork slot; wherein said balancing system drive gear rotation concurrently rotates aid sliding actuator, actuator linkage and shaft bearing actuator at the orbital speed of said output receiving gear, and control fork axial movement repositions said rotating sliding actuator and said actuator linkage transfers sliding actuator axial motion to reposition said rotating shaft bearing actuator and output receiving shaft bearing laterally with respect to the central axis and within said rotating balancing system drive gear slot to vary said output shaft speed.

6. The transmission as claimed in claim 5 with two parallel rotary drivers connecting (1) the input shaft to the driver ring gear, and (2) inversely connecting the output receiving gear shaft to the output shaft, each including:
A. a base disk attached to a shaft;
B. a universal shaft driver attached to another shaft;
C. at least one set of pivoting parallel arms connecting the base disk to the universal shaft driver, including: two pivoting parallel outer arms, their first ends pivotally connected to the base disk edge; a pivot link pivotally joining the pivoting parallel outer arm second ends and two pivoting parallel inner arms, their first ends pivotally connected to the pivoting parallel outer arm second ends and their second ends pivotally connected to the universal shaft driver, wherein a shaft section and base disk rotate concurrently with the universal shaft driver and another shaft section through the pivoting parallel outer arms, pivot link, and pivoting parallel inner arms, permitting the rotating universal shaft driver and attached shaft section to reposition from the mechanism central axis and orbit their axis at varying speeds and circumferences independent of its rotational speed.

7. The transmission as claimed in claim 6 wherein said orbital direct drive arrangement comprise said orbital driver gear rotating said balancing system drive disk by means of a centrally bored drum connecting the orbital driver gear to the balancing system drive disk and journaled through a supporting framework.

8. The transmission as claimed in claim 7 wherein said control means comprises a mechanical actuation mechanism connected to said balancing system drive disk, including:
A. a centrally bored sliding actuator with a control fork groove about its circumferential edge, at least one pivot mount attached thereto, and movably connected to the balancing system drive disk with guide pins;
B. at least one pivot mount attached to the end of one guide pin;
C. At least one pivot mount attached to an actuating bearing;
D. at least one actuator linkage with its first and pivotally attached to the guide pin pivot mount and its second end pivotally attached to the actuating bearing; in the alternative, a second actuator linkage with its first end pivotally attached to the actuating bearing pivot mount and its second end pivotally attached to the sliding actuator pivot mount, wherein the sliding actuator rotates with the drive disk, and control fork movement repositions the sliding actuator relative to the balancing system drive disk to concurrently reposition the actuating bearing relative to the mechanism central axis through the linkage and pivot mounts.

9. The transmission as claimed in claim 8 with said transfer gear engaged to and driving said balancing system drive disk.

10. A repositionable variable orbital aligner supporting a driving ring gear and an output receiving gear, including a rotating structural support with two depending arms and an axis of rotation varying between a first bore through the first arm supportatively sustaining a journaled driving ring gear shaft, and a second bore through the second arm supportatively sustaining a journaled output receiving gear shaft, said gears continuously aligned and engaged to alternately orbit one another as the central axis of each gear interchangeably aligns with the mechanism central axis, and both gears rotate and orbit upon a single plane during all operational configurations.

11. A parallel rotary driver mechanism dividing a revolving shaft into a first shaft section and a second shaft section, transmitting angular velocity and torque between said sections, the first shaft section rotating at a fixed axis, the second shaft section concurrently rotating at the speed of the first shaft section and repositionable to orbit said axis fixed at variable orbital speeds and circumferences independent of its rotating speed, including:
A. A base disk attached to the first shaft section;
B. a universal shaft driver attached to the second shaft section;
C. at least one set of pivoting parallel arms connecting the base disk to the universal shaft driver, including two pivoting parallel outer arms, their first ends pivotally connected to the base disk edge, a pivot link pivotally joining the pivoting parallel outer arm second ends, two pivoting parallel inner arms with their first ends pivotally connected to the pivoting parallel outer arm second ends and their second ends pivotally connected to the universal shaft driver, wherein rotation of the first shaft section rotates the second shaft section through the pivoting parallel outer arms, pivot link, and pivoting parallel inner arms, permitting the rotating universal shaft driver and the second shaft section to reposition from said fixed axis and orbit at varying speeds and circumference independent of its rotational speed.

12. A process for stepless and clutchless torque transmission in a drive arrangement having an input shaft, a set of conditioning gears, an input stage, an output stage, an output shaft, a central axis defined by the input shaft and the output shaft, an input universally positionable connecting linkage, an internally toothedly ring gear engaged to an output receiving gear, a variably orbital alignment arm, an output universally positionable connecting linkage, the process comprising:
translating rotation of said input shaft with said conditioning gears to concurrently rotate and orbit said ring gear by said input universally positionable connecting linkage,
changing the rotation of said output stage to a geared neutral configuration by orbiting the center of rotation of said ring gear about said output receiving gear by said input universally positionable connecting linkage,
continuously changing the rotation of said output stage from the geared neutral configuration to a predetermined maximum speed by continuously increasing the diameter of the orbit of the output receiving gear about said central axis by said output universally positionable connecting linkage, and concurrently decreasing the diameter of the orbit of the ring gear about said central axis by said input universally positionable connecting linkage,
converting the rotation of said output stage to rotation of the output shaft by said universally positionable output connecting linkage.

* * * * *

UNITED STATES PATENT AND TRADEMARK OFFICE
CERTIFICATE OF CORRECTION

PATENT NO. : 5,352,162
DATED : October 4, 1994
INVENTOR(S) : Paul Kay Coronel

It is certified that error appears in the above-indentified patent and that said Letters Patent is hereby corrected as shown below:

Column 1, line 56, should read: --geared device rather then induce a gear set to infinitely vary--

Column 10, between lines 22 and 23, insert:
--During operation of the parallel rotary driver of Figs. 8 and 9, the base disk 101, outer arms 105, inner arms 111, all connecting components and the universal shaft driver 112 are rotated by input shaft 1. Driver ring gear 21 is attached to the second end of ring gear shaft 22 and connected in a driving relation with the output receiving gear 23. The variable orbital aligner 19 freely pivots about ring gear shaft 22 on one end, and the output receiving gear shaft 26 on its second end as previously described and depicted within Figs. 1 and 5. The rotating balancing system drive gear 37 is driven through the input transfer gear 3, input receiving gear 5, transfer gear 7 and the optional gearing within boundary 40 of Fig. 1.

UNITED STATES PATENT AND TRADEMARK OFFICE
CERTIFICATE OF CORRECTION

PATENT NO. : 5,352,162
DATED : October 4, 1994
INVENTOR(S) : Paul Kay Coronel

It is certified that error appears in the above-indentified patent and that said Letters Patent is hereby corrected as shown below:

During initial actuation of transmission output beyond the geared neutral configuration, input shaft 1 rotates base disk 101 which drives universal shaft driver 112 through the outer parallel arms 105 and the inner parallel arms 111. These arms 105 and 111 pivot to reposition the universal shaft driver 112 relative to the central axis of the rotating base disk 101 in accordance with the orbital speed induced by the orbiting output receiving gear 23, variable orbital aligner 19, output receiving gear shaft 26, and the output receiving shaft bearing 39 as driven by the rotating balancing system drive gear 37. This permits the universal shaft driver 112 to independently <u>orbit</u> the base disk 101 central axis with a different orbital speed from the rotational speed of base disk 101. Yet the <u>rotational</u> speed of the universal shaft driver 112 remains identical with the rotational speed of base disk 101.

Actuating the transmission through movement of the control fork 47 repositions the output receiving shaft bearing 39, output receiving gear shaft 26 and the output receiving gear 23 away from the mechanism central axis. This results in a change of the degree of pivoting of the outer and inner parallel arms 105 and 111 which induces a variation of the size of the universal shaft driver 112 orbital path. The rotational speed of the balancing system drive gear 37 as set by its connecting gear train presets the orbital speed of the output receiving shaft bearing 39, output receiving gear shaft 26, and output receiving gear 23 which, in conjunction with the rotational and orbital speeds of the driver ring, gear 21 produce the predetermined transmission output speed for the given amount of actuation.

When the transmission is producing maximum output speed, the universal shaft driver 112 is now positioned to rotate at the mechanism central axis without orbiting, and the outer and inner parallel arms 105 and 111 experience no

UNITED STATES PATENT AND TRADEMARK OFFICE
CERTIFICATE OF CORRECTION

PATENT NO. : 5,352,162
DATED : October 4, 1994
INVENTOR(S) : Paul Kay Coronel

It is certified that error appears in the above-indentified patent and that said Letters Patent is hereby corrected as shown below:

pivoting.

During operation of the preferred embodiment of the transmission shown in Fig. 10, input shaft 1, first parallel rotary driver 90, shaft 22 and the attached driver ring gear 21 are rotated by the driving motor at a first speed. Gearing 3, 5, and 7 rotates orbital driver gear 9, attached driving drum 122, balancing system drive gear 123, linked actuating bearing 44, variable orbital aligner 19, and sliding actuator 130 at a second faster speed. Movement of control fork 137 laterally repositions sliding actuator 130 and guide pins 132 and 133 relative to drive disk 123 to actuate linkage 134 or 135 to reposition actuating bearing 44, variable orbital aligner 19, the output receiving gear shaft 26, and the output receiving gear 23 relative to the mechanism central axis. This repositions the components to any point between and including their geared neutral and high speed positions to actuate or modify the speed of dual concentric driving of output receiving gear 23 and attached shaft 26. The second parallel rotary shaft driver 91 converts concurrent orbital and rotational shaft 26 transmission output motion to constant shaft 49 output rotation.--

Signed and Sealed this

Fourth Day of July, 1995

Attest:

BRUCE LEHMAN

*Attesting Officer*   *Commissioner of Patents and Trademarks*